(12) United States Patent
Vietz

(10) Patent No.: US 12,172,170 B2
(45) Date of Patent: Dec. 24, 2024

(54) METHOD FOR PRODUCING SILICON FRAGMENTS

(71) Applicant: Wacker Chemie AG, Munich (DE)

(72) Inventor: Matthias Vietz, Mattighofen (AT)

(73) Assignee: Wacker Chemie AG, Munich (DE)

(*) Notice: Subject to any disclaimer, the term of this patent is extended or adjusted under 35 U.S.C. 154(b) by 279 days.

(21) Appl. No.: 17/639,309

(22) PCT Filed: Aug. 29, 2019

(86) PCT No.: PCT/EP2019/073062
§ 371 (c)(1),
(2) Date: Feb. 28, 2022

(87) PCT Pub. No.: WO2021/037366
PCT Pub. Date: Mar. 4, 2021

(65) Prior Publication Data
US 2022/0314228 A1  Oct. 6, 2022

(51) Int. Cl.
| | | |
|---|---|---|
| B02C 1/00 | (2006.01) | |
| B02C 1/10 | (2006.01) | |
| B25D 1/00 | (2006.01) | |
| B25D 1/14 | (2006.01) | |
| B25D 9/00 | (2006.01) | |
| C01B 33/021 | (2006.01) | |

(52) U.S. Cl.
CPC ............... B02C 1/005 (2013.01); B02C 1/10 (2013.01); *B02C 2201/00* (2013.01)

(58) Field of Classification Search
CPC ....... B02C 1/005; B02C 1/10; B02C 2201/00; B02C 13/00; B02C 13/04; B25D 9/00; B25D 2222/51; B25D 2250/291; B25D 1/14; B25D 1/00; C01B 33/021
See application file for complete search history.

(56) References Cited

U.S. PATENT DOCUMENTS

| | | | |
|---|---|---|---|
| 10,876,221 B2 * | 12/2020 | Pech | C01B 33/021 |
| 2012/0100302 A1 | 4/2012 | Fabry et al. | |
| 2013/0089488 A1 | 4/2013 | Sofin | |
| 2013/0189176 A1 * | 7/2013 | Wochner | C01B 33/037 |
| | | | 423/348 |
| 2013/0295408 A1 | 11/2013 | Weber et al. | |
| 2016/0201223 A1 * | 7/2016 | Pech | C30B 35/007 |
| | | | 241/23 |
| 2017/0001868 A1 * | 1/2017 | Faerber | C01B 33/035 |

FOREIGN PATENT DOCUMENTS

| | | |
|---|---|---|
| DE | 7534420 U | 2/1976 |
| EP | 0539097 B1 | 11/1994 |
| EP | 2444373 B1 | 12/2012 |
| EP | 2695874 A1 | 2/2014 |

(Continued)

*Primary Examiner* — Mohammed S. Alawadi

(57) ABSTRACT

The present disclosure relates to a method for producing polycrystalline silicon fragments. The process includes (a) providing a polycrystalline silicon rod, (b) working the surface of the silicon rod by means of a hammer or needle hammer to remove at least a portion of a layer of the surface of the polycrystalline silicon rod, and (c) reducing the silicon rod to fragments. Wherein an amount of impact energy expended by the hammer and/or needle hammer is from 1 J to 15 J.

13 Claims, 2 Drawing Sheets

(56) References Cited

FOREIGN PATENT DOCUMENTS

Figure 1:
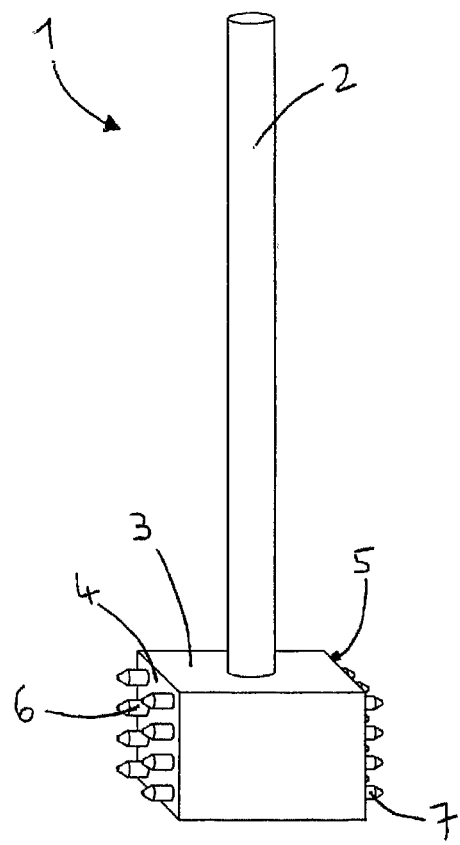

| | | | |
|---|---|---|---|
| EP | 2620411 | B1 | 9/2014 |
| EP | 2578724 | B1 | 4/2015 |
| EP | 2077252 | B1 | 2/2017 |
| EP | 2662335 | B1 | 4/2017 |
| EP | 3036190 | B1 | 6/2017 |
| TW | I586509 | B | 6/2017 |

\* cited by examiner

METHOD FOR PRODUCING SILICON FRAGMENTS

CROSS-REFERENCE TO RELATED APPLICATIONS

This application is a U.S. National Phase application of PCT Application No. PCT/EP2019/073062 filed on Aug. 29, 2019 the disclosure of which is incorporated by reference herein in its entirety.

The invention relates to a process for producing silicon chunks, wherein the surface of the silicon rod is treated with a hammer and/or needle hammer to at least partially remove a surface layer.

Polycrystalline silicon (polysilicon) serves as a starting material in the production of single-crystal (monocrystalline) silicon, for example by means of crucible pulling (Czochralski or CZ process) or by means of zone melting (float zone process). Single-crystal silicon is used in the semiconductor industry for the manufacture of electronic components (chips).

Polysilicon is also needed for the production of multicrystalline silicon, for example by means of block casting processes. The multicrystalline silicon, obtained in the form of a block, can be used for the manufacture of solar cells.

Polysilicon is obtainable by the Siemens process—a chemical vapor deposition process. This comprises heating support bodies (usually composed of polysilicon) in a bell-shaped reactor (Siemens reactor) by direct passage of current and introducing a reaction gas comprising a silicon-containing component and hydrogen. The silicon-containing component is generally monosilane ($SiH_4$) or a halosilane of the general composition $SiH_nX_{4-n}$ (n=0, 1, 2, 3; X=Cl, Br, I). It is typically a chlorosilane or a chlorosilane mixture, usually trichlorosilane ($SiHCl_3$, TCS). Predominantly, $SiH_4$ or TCS is used in a mixture with hydrogen. The structure of a typical Siemens reactor is described for example in EP 2 077 252 A2 or EP 2 444 373 A1. The bottom of the reactor (bottom plate) is generally provided with electrodes that receive the support bodies. The support bodies are customarily filament rods (slim rods) made of silicon. Typically, two filament rods are connected via a bridge (made of silicon) to form a pair that forms a circuit via the electrodes. The surface temperature of the filament rods is typically more than 1000° C. during the deposition. At these temperatures, the silicon-containing component of the reaction gas decomposes and elemental silicon is deposited from the vapor phase as polysilicon. The diameter of the filament rods and of the bridge increases as a result. After reaching a predetermined diameter of the rods, the deposition is usually stopped and the polysilicon rods obtained are removed. After removal of the bridge, approximately cylindrical silicon rods are obtained. These are typically comminuted using a crusher (for example a jaw crusher) and packaged into containers of various sizes. The automatic comminution is optionally preceded by a pre-comminution (for example manually with a hammer).

The morphology of the polysilicon rods and of the chunks produced therefrom generally has a strong influence on performance during further processing. The morphology of a polysilicon rod is in principle determined by the parameters of the deposition process (for example rod temperature, silane and/or chlorosilane concentration, specific flow rate). Interfaces of different morphology regions may be formed during the deposition according to the parameters. These morphology regions may in particular contain holes and/or trenches to different extents. EP 2 662 335 A1 describes how polysilicon rods having different concentric morphology regions are obtainable by variation of the parameters.

The morphology of polysilicon can range from compact and smooth to very porous and fissured. Compact polysilicon is substantially free from cracks, pores, joints and fissures. The apparent density of polysilicon of this type can be equated to the true density of silicon or at least corresponds to this to a good approximation. The true density of silicon is 2.329 $g/cm^3$.

An often encountered problem, especially in the production of polysilicon rods having large diameters (>150 mm), is the formation of a fissured surface layer, also described as popcorn. This is to be understood as including cracks, pores, joins and/or splits which increase the surface area of the polysilicon rod. While a formation of popcorn may be countered by adapting process parameters, this is usually associated with a lengthier process duration and thus reduced output. Popcorn may otherwise also form through spontaneous occurrences such as dust depositions, where countermeasures are principally only possible upon early detection.

A porous and fissured morphology has negative consequences in particular on the crystallization behavior of polysilicon. This is particularly apparent in the CZ process for producing single-crystal silicon. Here, the use of fissured and porous polysilicon leads to economically unacceptable yields. In the CZ process, particularly compact polysilicon generally leads to markedly higher yields. A crystallization process or a certain form of such a process generally only achieves an economic optimum when the starting material employed is a polysilicon having a morphology that does not exceed a threshold value. Popcorn-containing polysilicon rods (whole or comminuted) are generally not contemplated as a starting material for producing single-crystal silicon.

Accordingly, polysilicon is distinguished and classified not only according to its purity but also according to its morphology. The presence of popcorn in principle results in grading into a lower quality class. While it is possible after comminution of popcorn-containing polysilicon rods to separate compact chunks from fissured ones, such processes are however costly and inconvenient and also time-intensive.

The invention accordingly has for its object to provide a process with which a popcorn layer is selectively removable after the deposition process.

This object is achieved by a process for producing silicon chunks comprising the steps of:
  a) providing a silicon rod or a chunk,
  b) treating the surface of the silicon rod with a hammer and/or needle hammer for at least partial removal of a surface layer,
  c) comminuting the silicon rod into chunks,
  wherein the impact energy applied with the hammer and/or needle hammer is 1 to 15 J.

The silicon rod is in particular a polysilicon rod, preferably produced by the Siemens process. The polysilicon rod is preferably provided immediately after its removal from a gas phase deposition reactor, in particular a Siemens reactor as described at the outset. The providing is preferably carried out with a crane or gripper.

The length of the silicon rods (after removal of the bridge and optionally of a region that has grown atop the electrode) is typically 1 to 3.5 m. Sections of the silicon rod of any desired length may in principle also be treated. The diameter of the silicon rods to be treated in step a) is normally 50 to 350 mm.

The providing of the silicon rod may be carried out in a clean room. It may be placed lying on a workbench therein for example. The silicon rod may in principle also be provided standing up, in particular on a rotatable base, for example. The use of a clean room or a workbench with a protective gas atmosphere is not compulsory but can, where necessary, increase the degree of purity of the chunks.

The hammer is in particular a manual hammer, which preferably has a total weight of not more than 2 kg. It ideally has a total weight of 800 to 1500 g. The hammer in principle comprises a handle and a head, wherein the head has at least one silicon-contacting region comprising an impact surface. The geometry of the impact surface is preferably flat (face) or may be slightly curved outward. A fin such as in a fitter's hammer is also conceivable. The silicon-contacting region may be made of a different material to the rest of the head. The impact surface may also have a coating. A hammer as described in EP 0 539 097 A1 for example may be concerned.

In the present case a needle hammer is to be understood as meaning a hammer comprising a plurality (in particular ≥6) of punctiform (needle-like) impact surfaces, wherein the impact surface is especially circular and preferably has a radius of 0.5 to 1.5 mm, particularly preferably of 0.5 to 1 mm. The top surface of a conical frustum may be concerned in particular. The top surface may optionally be curved (convex).

The needle hammer may be for example a handheld hammer whose head has a profiled face. The face is preferably profiled with at least six conical elevations (needles) which each have an impact surface as described in the previous paragraph. The elevations may have a height of 5 to 20 mm. Such a hammer may show similarities to a meat tenderizer (cf. FIG. 1).

In a preferred embodiment, the needle hammer is a mechanically operated (pneumatically, electrically or hydraulically) instrument which is typically guided by hand. Synonyms for such a needle hammer include inter alia needlegun scaler and needle scaler. Such instruments may also be used for removing rust, scale and paint layers and are commercially available. The needle hammer comprises a plurality of needles (generally ≥6) which are collectively referred to as a needle pack. The needles are generally inserted into bores of a needle plate. The drive causes the needles to individually shoot forward in the direction of the object to be treated. The needles generally have a length of 5 to 25 cm. Their diameter is typically 2 to 5 mm. A typical needle diameter is 3 mm. The needles are especially tapered and form an impact surface having a radius of 0.5 to 1.5 mm, particularly preferably of 0.5 to 1 mm.

The treating of the surface in step b) is particularly preferably carried out with a mechanical needle hammer. However, it is optionally possible to use a hammer or a manual needle hammer to carry out an aftertreatment.

The impact energy applied with the hammer and/or needle hammer is preferably 2 to 10 J, particularly preferably 3 to 8 J. A typical range for the impact energy is 5 to 8 J. In the case of the mechanical needle hammer, the recited values in each case refer to one needle. In mechanically operated needle hammers, the impact energy can normally be predefined and in some cases is even continuously variable.

For the hammer and the manual needle hammer, the different impact energies may be realized especially by varying the fall height.

The mechanical needle hammer is by preference operated at an impact speed of 2000 to 5000 $min^{-1}$, preferably 2500 to 4000 $min^{-1}$, particularly preferably 2800 to 3500 $min^{-1}$.

The needle hammer preferably comprises 6 to 24, particularly preferably 6 to 18, especially preferably 6 to 12, needles. It is in principle immaterial to the workability of the invention whether the needles are cylindrical and/or conical elevations on the hammer head, as in the case of the manual needle hammer, or 5 to 25 cm long steel rods, as in the case of the mechanical needle hammer.

It has been found that using a hammer or needle hammer with a maximum impact energy of 15 J makes it possible to remove a surface layer of popcorn from silicon rods not only particularly selectively but also over a large area in an economically acceptable timeframe. This was unexpected on account of the brittleness of silicon. Selective is here especially to be understood as meaning that the thickness of the layer to be removed may be kept substantially constant and may be varied according to the constitution of the silicon rod surface.

A high selectivity is achieved on account of the multiplicity of low energy impacts by the needles of the needle hammer. It has further been found that through the use of suitable hard metal materials, only a very low contamination of the silicon with the relevant hard metal is detectable. Thus for example when using a needle hammer having 6 or 12 needles (impact energy 6 J) made of tungsten carbide, a contamination of less than 10 pptw of tungsten was detected. In the case of a needle hammer having 26 needles (impact energy 6 J), the contamination was less than 20 pptw. Contamination after treatment may be determined for example using ICP-MS (inductively coupled plasma-mass spectrometry). To produce the sample, the surface of a defined rod segment is rinsed with a mixture of $HF/HNO_3$. The contamination with metals can then be related to the weight of the specimen.

Even the use of a 1 kg hammer (cf. EP 0 539 097 A1) having an impact surface made of tungsten carbide and an impact energy of 15 J resulted in low values of less than 50 pptw of tungsten.

The needles of the needle hammer and/or at least the silicon-contacting part of the hammer, in particular the impact surface, are preferably made of a low-contamination material selected from the group consisting of carbides, metal-ceramics, ceramics and combinations thereof.

The material is particularly preferably selected from the group comprising tungsten carbide, tungsten carbide with a cobalt binder, tungsten carbide with a nickel binder, titanium carbide, chromium carbide (for example $Cr_3C_2$) with a nickel-chromium alloy binder, tantalum carbide, niobium carbide, silicon nitride, silicon carbide in a matrix (e.g. Fe, Ni, Al, Ti or Mg), aluminum nitride, titanium carbide with cobalt and titanium carbonitride, nickel, nickel-cobalt alloy, iron and combinations thereof.

One example of a suitable material based on tungsten carbide may be found in EP 3 036 190 B1.

The contamination of the polysilicon with metals from the materials of the hammer or needle hammer after the treatment in step b) is preferably less than 50 pptw, in particular less than 30 pptw, of the relevant metal.

The surface layer which is in particular popcorn, i.e. silicon traversed by cracks, holes and/or pores, is preferably removed to a depth of 1 to 10 mm, particularly preferably 1 to 5 mm, especially preferably 1 to 3 mm, in process step b). Layers of only 1 mm in thickness may also be selectively removed both with the hammer and with the needle hammer. The depth to which material is to be removed also depends in particular on the diameter of the silicon rod to be processed and the compactness of the remaining material (breaking of the rod should generally be sought to be avoided). The values for the material removal depth are generally average values. It is quite typical for certain surface regions of a silicon rod to contain less popcorn than others. The depth of material removal may be varied accordingly. For economic reasons, typically only partially popcorn-covered silicon rods are treated in step b).

In a preferred embodiment of the process, a determination of the roughness of the silicon rod is carried out between steps a) and b) and/or between steps b) and c).

This especially makes it possible to determine the depth to which an undesired surface layer (popcorn) is to be removed before performing step b). The determined roughness can further make it easier to choose a suitable hammer or needle hammer.

The determination of roughness after step b) can in particular be used to check the success of the treatment. Depending on the determined roughness, step b) is optionally repeated, i.e. the silicon rod is aftertreated.

In the simplest case, the determination of roughness may be a visual determination. A person skilled in the art can approximately determine the thickness of the surface layer to be removed/whether an aftertreatment is required based on the degree of surface fissuring.

It is further possible to perform an indirect measurement using a transparent film as described in EP 2 578 724 A1. This comprises wrapping a silicon rod with the film and accordingly marking areas with popcorn on the film. The film with the markings is subsequently photographed and the popcorn fraction is determined by image processing in order thus to allow conclusions about roughness to be drawn. However, the time-intensive nature of this approach is a disadvantage.

Determination of roughness is, however, preferably performed by technical means. Various methods are contemplated therefor.

A tactile method of measurement according to ISO 4288: 1998 may be employed, for example. This comprises determining surface roughness via a stylus. However, this process has only limited applicability in case of pronounced fissuring of the surface due to the high variance.

Contactless 2D and 3D methods of measurement are preferred in the determination of roughness. For example, laser-optical scanning can be used to produce a microprofile of the silicon rod surface. It is also possible to produce topographic images of the rod surface by means of which areas with popcorn can be identified. The principle of measurement is based on measuring the angle of the reflected scattered light. The microprofile can especially be used to determine the roughness parameters Ra (arithmetic average deviation of the profile, roughness average) and RPc (peak count number) according to DIN EN ISO 4287/4288 and DIN EN 10049. Topographic images especially make it possible to derive parameters for roughness by image processing, for example from the ratio of minima (valleys) to maxima (peaks).

The surface of the silicon rod after the treatment in step b) is preferably closed, i.e. substantially no longer comprises cracks, pores or holes. In the case of a completely closed surface, the roughness values (for example Ra) are in principle irrelevant since a comminution follows anyway. However, topographic images generated, for example, by laser scanning can be used to identify areas that must be subjected to renewed treatment. It may therefore be preferable when the treated silicon rod is only supplied to the comminution in step c) when at least 85%, preferably at least 90%, particularly preferably at least 95%, of the surface no longer comprises cracks, pores or holes. If the silicon rod does not meet this requirement a repetition of step b), i.e. an aftertreatment, may be carried out which may then be followed by renewed laser scanning.

Process as claimed in any of the preceding claims, characterized in that the comminuting in step c) is carried out via a thermal crushing process or via high-voltage impulse crushing.

The comminution may also be carried out using conventional jaw or roller crushers. The comminution may also be carried out using a hammer (for example 5 to 7 kg sledgehammer) or a pneumatic chisel.

It is preferable when a cleaning step is carried out between steps b) and c) and/or after step c).

Furthermore, step c) may also be a pre-comminution which is followed by at least one further comminution step, optionally followed by a sorting. A comminution of polysilicon in conjunction with a cleaning step is described in EP 2 695 874 A1.

The process according to the invention is especially a constituent of a process for producing polycrystalline silicon comprising the steps of:

depositing silicon by chemical gas phase deposition by introducing a reaction gas, which in addition to hydrogen contains silane and/or at least one halosilane, into a reaction space of a reactor, wherein the reaction space comprises at least one heated filament rod upon which the silicon is deposited to form a polycrystalline silicon rod, deinstalling and providing the polycrystalline silicon rod, treating the silicon rod surface with a hammer and/or needle hammer for at least partial removal of a surface layer, comminuting the treated silicon rod into chunks.

FIG. 1: Manual needle hammer according to the invention

Figure 2:
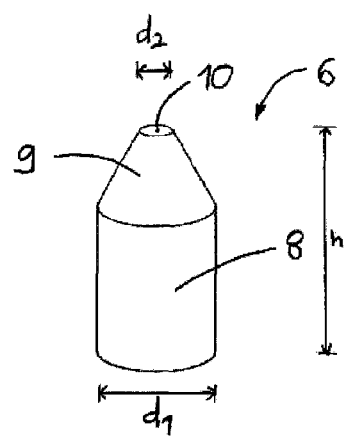

FIG. 2: Detailed representation of a needle

FIG. 1 shows a manual needle hammer 1 having a handle 2 and a head 3. Both the handle 2 and the head 3 have a stainless steel core sheathed in a plastic (for example polyethylene, polypropylene or polyurethane). The head 3 has a first and a second flat, rectangular front end (face) 4, 5. Eight needles 6 are arranged on the first front end 4 and 12 needles 7 are arranged on the second front end 5. The needles 6, 7 may be screwed together with the stainless steel core for example and are not covered with the plastic. A detailed representation of a needle 6 is shown in FIG. 2. The needles 6 have a larger diameter than the needles 7. A symmetric arrangement of the needles 6, 7 is not compulsory. A typical hammer 1 has a weight of 1 kg, for example, and the needles 6, 7 have a diameter $d_1$ of 4 mm or 3 mm.

FIG. 2 shows a detailed representation of a needle 6 from FIG. 1. The needle 6 has a cylindrical part 8 and a point 9. The cylindrical part 8 has a diameter $d_1$ of for example 4 mm. The point 9 has the shape of a conical frustum and the circular top surface 10 constitutes the impact surface. The top surface 10 typically has a diameter $d_2$ of 1 mm. The height h of the needle 6 is about 12 mm.

EXAMPLE 5 inventive treatment tools (hammers and needle hammers, lines 1 to 5) and 2 manual hammers (lines 6 and 7) were tested for removal of popcorn on polysilicon rods having a diameter of about 250 mm. The rods originated from the same batch (outer rod circle) from a Siemens reactor having an output of 24 rod pairs. All rods exhibited popcorn in the upper region where the bridge was previously located (the depth of the trenches was up to 4 mm).

The rods were weighed before and after treatment to calculate yield. Determination of the treated rod area was carried out using a stopwatch and before and after images, and image processing software was utilized for surface determination.

Contamination was determined using ICP-MS as described. The impact energies of the pneumatic needle hammers were predefined on the instrument. The impact energies for the manual hammers are average values determined by means of piezoelectric force sensors. The hammer was clamped in an apparatus and dropped onto the measuring apparatus from different heights. The test setup was conceived such as to allow reproducible repetition of the test results. Selectivity was determined on the basis of topographic images captured after treatment (by laser-optical scanning), wherein "++" corresponds to very uniform material removal with complete popcorn removal and "−" corresponds to irregular material removal with a high loss of target material. "−−" corresponds to fracture of the polysilicon rod (see table 1).

The needles of the pneumatic needle hammer comprised a tungsten carbide cobalt (WC—Co) hard metal having a Co proportion of 10%. The particle size of the WC was 0.6 μm. The needles had a round impact surface having a diameter of 1 mm and an overall diameter of 3 mm. The needles of the manual needle hammer (cf. FIG. 1) were likewise made of WO—Co hard metal as described hereinabove. The impact surface of the needles was identical to the needles of the pneumatic needle hammers. The hammer from line 1 was a hammer according to EP 0 539 097 A1 whose impact surface was made of a WO—Co hard metal as described hereinabove. The heads of the manual hammers from lines 6 and 7 were made of a WC—Co hard metal having a Co proportion of 10% and a WC particle size of 2.5 to 4 μm. The impact surface was round and minimally curved outwards.

TABLE 1

| # | Treatment tool | Impact energy | Contamination W [pptw] | Selectivity | Yield [%] (proportion of target material) | Treated rod area/second |
|---|---|---|---|---|---|---|
| 1 | hammer (1 kg) | 10 to 15 J | 50 pptw | + | 75% | 5 cm² |
| 2 | pneumatic needle hammer (6 needles) | 6 J | <10 pptw | ++ | >95% | 1-5 cm² |
| 3 | pneumatic needle hammer (12 needles) | 6 J | <10 pptw | ++ | 90% | 2-8 cm² |
| 4 | pneumatic needle hammer (24 needles) | 6 J | 20 pptw | ++ | 85% | 5-10 cm² |
| 5 | manual needle hammer (9 needles, 1 kg) | 10 to 15 J | <10 pptw | ++ | >95% | 1-2 cm² |
| 6 | hammer (2.5 kg) | 100 J | 200 pptw | − | 50% | 20 cm² |
| 7 | hammer (6 kg) | 300 J | 1000 pptw | −− | 20% | − |

It is readily apparent from the examples that using pneumatic needle hammers having 6 or 12 needles results in very good selectivity coupled with very low contamination with tungsten. The yield is even greater for 6 needles than for 12, but this is associated with a longer working time. Economy here especially also depends on the type (the required quality) of the produced polysilicon rod.

A very good yield and selectivity coupled with only low contamination is likewise realized with the manual needle hammer (cf. FIG. 1). Depending on the fall height, the impact energy varies here within narrow limits. At low impact energy the known hammer of line 1 may also be an alternative to the previously described variants, since contamination is within an acceptable range and relatively large areas can be treated in a short time. This hammer may be an advantageous alternative especially for spot-removal of popcorn.

Selective removal of the popcorn is not possible with the manual hammers of lines 6 and 7. The 2.5 kg hammer caused very large areas of spalling and thus very imprecise removal of the popcorn layer. The use of the 6 kg hammer resulted in fracture of the rods. Removal of the layer was not possible.

The invention claimed is:

1. A process for producing silicon chunks, comprising the steps of:
   a) providing a silicon rod;
   b) treating a surface of the silicon rod with a hammer and/or a needle hammer for at least partial removal of a silicon layer of the surface of the silicon rod;
   c) comminuting the silicon rod into chunks using a thermal crushing process or a high-voltage impulse crushing or a jaw crusher, a roller crusher, a chisel or a sledgehammer apparatus; and
   wherein the silicon layer of the surface of the silicon rod is removed to a depth of 1 to 10 mm by an impact energy applied with the hammer and/or needle hammer of 1 to 15 J.

2. The process of claim 1, wherein the impact energy applied with the hammer and/or needle hammer is 2 to 10 J or wherein the impact energy applied with the hammer and/or needle hammer is 3 to 8 J.

3. The process of claim 1, wherein the needle hammer comprises 6 to 24 needles, wherein the needle hammer comprises 6 to 18 needles, or wherein the needle hammer comprises 6 to 12, needles.

4. The process of claim 1, wherein the needle hammer comprises needles; and
   wherein the needles of the needle hammer each have a circular impact surface having a radius of 0.5 to 1.5 mm, or wherein the needles of the needle hammer each have a circular impact surface having a radius of 0.5 to 1 mm.

5. The process of claim 4, wherein the needle hammer is operated with an impact speed of 2000 to 5000 $min^{-1}$, wherein the needle hammer is operated with an impact speed of 2500 to 4000 $min^{-1}$, or wherein the needle hammer is operated with an impact speed of 2800 to 3500 $min^{-1}$.

6. The process of claim 1, wherein the needle hammer is an electrically, a pneumatically or a hydraulically operated needle hammer.

7. The process of claim 1, wherein the needle hammer comprises needles; and
   wherein the needles of the needle hammer and/or at least a polysilicon-contacting part of the hammer is made of a material selected from the group comprising carbide, metal-ceramic, ceramic and combinations thereof.

8. The process of claim 1, wherein the needle hammer comprises needles; and
   wherein the needles of the needle hammer and/or at least a polysilicon-contacting part of the hammer is made of tungsten carbide, tungsten carbide with a cobalt binder, tungsten carbide with a nickel binder, titanium carbide, chromium carbide with a nickel-chromium alloy binder, tantalum carbide, niobium carbide, silicon nitride, silicon carbide in a matrix, aluminum nitride, titanium carbide with cobalt and titanium carbonitride, nickel, nickel-cobalt alloy, iron and combinations thereof.

9. The process of claim 1, wherein the silicon layer of the surface of the silicon rod is removed to the depth of 1 to 5 mm or wherein the silicon layer of the surface of the silicon rod is removed to the depth of 1 to 3 mm.

10. The process of claim 1, wherein roughness parameters Ra and/or RPc according to DIN EN ISO 4287/4288 and DIN EN 10049 of the silicon rod are determined between steps a) and b) and/or between steps b) and c).

11. The process of claim 1, wherein the step b) is repeated after a determination of the roughness of the treated silicon rod.

12. The process of claim 1, wherein the silicon layer of the surface of the silicon rod at least partially removed is a surface layer of popcorn.

13. The process of claim 1, wherein the silicon layer of the surface of the silicon rod at least partially removed is a surface layer of popcorn; and
    wherein the popcorn layer of the surface of the silicon rod is removed to the depth of 1 to 5 mm or wherein the popcorn layer of the surface of the silicon rod is removed to the depth of 1 to 3 mm.

\* \* \* \* \*